(12) United States Patent
Takagi

(10) Patent No.: US 8,936,120 B2
(45) Date of Patent: Jan. 20, 2015

(54) UTILITY VEHICLE HAVING A FRONT ELECTRIC MOTOR

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 152 days.

(21) Appl. No.: 13/340,477

(22) Filed: Dec. 29, 2011

(65) Prior Publication Data

US 2013/0168174 A1 Jul. 4, 2013

(51) Int. Cl.
*B60K 17/16* (2006.01)

(52) U.S. Cl.
USPC ............................. 180/65.22; 475/5; 180/291

(58) Field of Classification Search
USPC ........ 180/65.22, 291, 292, 299, 65.1, 65.235, 180/65.24, 65.285, 65.31, 69.6; 903/906; 60/598; 475/5
See application file for complete search history.

(56) References Cited

U.S. PATENT DOCUMENTS

| | | | | | |
|---|---|---|---|---|---|
| 1,178,144 | A | * | 4/1916 | Fend | 180/57 |
| 1,223,495 | A | * | 4/1917 | Kelley | 180/57 |
| 2,001,029 | A | * | 5/1935 | Kulick et al. | 180/56 |
| 2,683,497 | A | * | 7/1954 | Klaue | 180/68.1 |
| 3,013,167 | A | * | 12/1961 | Bobula | 310/90 |
| 3,469,646 | A | * | 9/1969 | O'Connor | 180/255 |
| 3,777,837 | A | * | 12/1973 | Harper | 180/11 |
| 4,050,328 | A | * | 9/1977 | Romick | 475/221 |
| 4,217,794 | A | * | 8/1980 | Yasui et al. | 475/160 |
| 4,235,300 | A | * | 11/1980 | Capjon | 180/254 |
| 4,280,583 | A | * | 7/1981 | Stieg | 180/250 |
| 4,643,045 | A | * | 2/1987 | Katayama | 475/198 |
| 4,936,406 | A | * | 6/1990 | Tezuka et al. | 180/249 |
| RE33,278 | E | * | 7/1990 | Johnshoy | 475/6 |
| 5,006,098 | A | * | 4/1991 | Yoshinaka et al. | 475/86 |
| 5,065,835 | A | * | 11/1991 | Richter et al. | 180/197 |
| 5,099,944 | A | * | 3/1992 | Kageyama et al. | 180/249 |
| 5,129,476 | A | * | 7/1992 | Kikuchi et al. | 180/234 |
| 5,287,942 | A | * | 2/1994 | Maebayashi et al. | 180/297 |
| 5,351,782 | A | * | 10/1994 | Kameda | 180/297 |
| 5,528,958 | A | * | 6/1996 | Hauser | 74/606 R |
| 5,680,908 | A | * | 10/1997 | Reed | 180/65.245 |
| 6,082,476 | A | * | 7/2000 | Stulbach | 180/65.25 |
| 6,148,948 | A | * | 11/2000 | Shimizu et al. | 180/446 |
| 6,275,763 | B1 | * | 8/2001 | Lotito et al. | 701/71 |
| 6,422,109 | B1 | * | 7/2002 | Jolliff et al. | 74/730.1 |
| 6,615,946 | B2 | * | 9/2003 | Pasquini et al. | 180/248 |
| 6,675,922 | B2 | * | 1/2004 | Kawamoto et al. | 180/76 |
| 6,704,627 | B2 | * | 3/2004 | Tatara et al. | 701/22 |
| 6,862,511 | B1 | * | 3/2005 | Phillips et al. | 701/54 |
| 6,988,779 | B2 | * | 1/2006 | Amanuma et al. | 303/152 |
| 7,134,517 | B1 | * | 11/2006 | Kaiser et al. | 180/65.6 |
| 7,216,943 | B2 | * | 5/2007 | Nishikawa et al. | 303/152 |
| 7,229,378 | B2 | * | 6/2007 | Mueller et al. | 475/204 |
| 7,337,869 | B2 | * | 3/2008 | Gray et al. | 180/307 |
| 7,364,524 | B2 | * | 4/2008 | Marsh et al. | 475/5 |
| 7,458,437 | B2 | * | 12/2008 | Davidsson | 180/233 |

(Continued)

*Primary Examiner* — Brodie Follman
(74) *Attorney, Agent, or Firm* — Alleman Hall McCoy Russell & Tuttle LLP

(57) ABSTRACT

A hybrid utility vehicle is provided. The hybrid utility vehicle may include right and left front wheels suspended from a vehicle body. The hybrid utility vehicle may further include a front differential gear device coupled to the right and left front wheels via a pair of front axles, respectively, the differential gear device including an input shaft extending in a direction substantially perpendicular to the front axles. The hybrid utility vehicle may further include a front electric motor positioned at a front portion of the vehicle body and coupled to the input shaft of the front differential gear device.

17 Claims, 6 Drawing Sheets

(56) References Cited

U.S. PATENT DOCUMENTS

| | | | |
|---|---|---|---|
| 7,497,286 B2* | 3/2009 | Keller et al. | 180/65.6 |
| 7,559,390 B2* | 7/2009 | Marsh et al. | 180/65.6 |
| 7,568,539 B2* | 8/2009 | Abe et al. | 180/65.25 |
| 7,617,903 B2* | 11/2009 | Byers et al. | 180/291 |
| 7,699,737 B2* | 4/2010 | Berhan | 475/5 |
| 7,747,363 B1* | 6/2010 | Tang | 701/22 |
| 7,793,764 B2* | 9/2010 | Fujimoto et al. | 188/71.4 |
| 7,860,624 B2* | 12/2010 | Kubota et al. | 701/41 |
| 7,966,114 B2* | 6/2011 | Yamazaki | 701/41 |
| 7,990,004 B2* | 8/2011 | Aikawa et al. | 310/89 |
| 8,055,420 B2* | 11/2011 | Matsuno et al. | 701/69 |
| 8,061,464 B2* | 11/2011 | Boesch | 180/197 |
| 8,116,927 B2* | 2/2012 | Yu et al. | 701/22 |
| 8,469,133 B2* | 6/2013 | Kaiser et al. | 180/248 |
| 8,485,292 B2* | 7/2013 | Wakatsuki | 180/65.22 |
| 8,561,735 B2* | 10/2013 | Morrow et al. | 180/65.1 |
| 2001/0011611 A1* | 8/2001 | Poerschmann | 180/65.1 |
| 2001/0017226 A1* | 8/2001 | Ohsawa | 180/65.2 |
| 2002/0003058 A1* | 1/2002 | Hori et al. | 180/248 |
| 2002/0066612 A1* | 6/2002 | Kawamoto et al. | 180/250 |
| 2002/0086763 A1* | 7/2002 | Kobayashi | 475/198 |
| 2002/0128108 A1* | 9/2002 | Jolliff et al. | 475/198 |
| 2003/0037977 A1* | 2/2003 | Tatara et al. | 180/65.3 |
| 2003/0042053 A1* | 3/2003 | Yoshikawa et al. | 180/65.1 |
| 2005/0107204 A1* | 5/2005 | Van Druten et al. | 475/198 |
| 2005/0139401 A1* | 6/2005 | Fujioka | 180/65.2 |
| 2005/0155800 A1* | 7/2005 | Hasegawa | 180/22 |
| 2005/0257989 A1* | 11/2005 | Iwami et al. | 180/443 |
| 2006/0069481 A1* | 3/2006 | Kubota et al. | 701/41 |
| 2006/0166777 A1* | 7/2006 | Aikawa et al. | 475/149 |
| 2006/0225930 A1* | 10/2006 | Schulte | 180/65.4 |
| 2007/0023211 A1* | 2/2007 | Keller et al. | 180/65.2 |
| 2007/0137908 A1* | 6/2007 | Fujiwara et al. | 180/65.2 |
| 2007/0240927 A1* | 10/2007 | Kitai et al. | 180/312 |
| 2007/0251739 A1* | 11/2007 | Marsh et al. | 180/65.1 |
| 2007/0254765 A1* | 11/2007 | Marsh et al. | 475/220 |
| 2007/0290551 A1* | 12/2007 | Fujimoto et al. | 303/6.01 |
| 2008/0017434 A1* | 1/2008 | Harper et al. | 180/370 |
| 2008/0060867 A1* | 3/2008 | Oda et al. | 180/291 |
| 2008/0191571 A1* | 8/2008 | Fukuda et al. | 310/91 |
| 2008/0221770 A1* | 9/2008 | Matsuno et al. | 701/80 |
| 2008/0223651 A1* | 9/2008 | Smith et al. | 180/376 |
| 2008/0230294 A1* | 9/2008 | Smith et al. | 180/233 |
| 2008/0314039 A1* | 12/2008 | Gray et al. | 60/445 |
| 2009/0160274 A1* | 6/2009 | Aikawa et al. | 310/83 |
| 2009/0197730 A1* | 8/2009 | Berhan | 475/150 |
| 2009/0200858 A1* | 8/2009 | Iwaki | 303/11 |
| 2009/0235780 A1* | 9/2009 | Zink | 74/665 A |
| 2009/0325754 A1* | 12/2009 | Shibagaki | 475/220 |
| 2010/0025131 A1* | 2/2010 | Gloceri et al. | 180/65.28 |
| 2010/0155161 A1* | 6/2010 | Corradini | 180/65.22 |
| 2010/0155168 A1* | 6/2010 | Mies | 180/300 |
| 2011/0042160 A1* | 2/2011 | Schapf | 180/384 |
| 2011/0073403 A1* | 3/2011 | Bennett et al. | 180/292 |
| 2011/0259657 A1* | 10/2011 | Fuechtner | 180/65.21 |
| 2012/0037441 A1* | 2/2012 | Frohnmayer et al. | 180/210 |
| 2012/0096985 A1* | 4/2012 | Kasuya et al. | 74/661 |
| 2012/0158233 A1* | 6/2012 | Makino | 701/22 |
| 2012/0247856 A1* | 10/2012 | Shinde et al. | 180/216 |
| 2013/0019707 A1* | 1/2013 | Ebihara et al. | 74/468 |
| 2013/0075183 A1* | 3/2013 | Kochidomari et al. | 180/292 |
| 2013/0130856 A1* | 5/2013 | Li et al. | 475/5 |
| 2013/0130857 A1* | 5/2013 | Gassmann | 475/150 |
| 2013/0168174 A1* | 7/2013 | Takagi | 180/233 |
| 2013/0190124 A1* | 7/2013 | Gassmann | 475/150 |
| 2013/0324342 A1* | 12/2013 | Onozaki et al. | 475/150 |
| 2013/0331217 A1* | 12/2013 | Kobayashi et al. | 475/5 |
| 2014/0128192 A1* | 5/2014 | Korenaga et al. | 475/5 |

\* cited by examiner

UTILITY VEHICLE HAVING A FRONT ELECTRIC MOTOR

BACKGROUND OF THE INVENTION

1. Field of the Invention

The present invention relates to utility vehicles which are used for various uses, for example, transportation or travelling on golf fields, farms, etc., and are required to have off-road steerability and off-road mobility on unpaved roads such as bumpy or muddy roads.

2. Description of the Related Art

Typically, a conventional utility vehicle includes an internal combustion engine as a driving power source. For example, U.S. Pat. No. 7,793,764 discloses an engine unit including an internal combustion engine and a transmission which are unitarily coupled together. The engine unit is positioned below a seat in the utility vehicle. The transmission is coupled to a front differential gear device via a front propeller shaft extending forward, and the front differential gear device is coupled to right and left front wheels via a pair of front axles extending to the right and to the left, respectively. The input shaft of the front differential gear device extends rearward therefrom and is coupled to the front propeller shaft. The transmission is coupled to a rear differential gear device via a rear propeller shaft extending rearward, and the rear differential gear device is coupled to right and left rear wheels via a pair of rear axles, respectively.

If a power unit including an internal combustion engine and an electric motor is incorporated into a utility vehicle as a driving power source, instead of a general power unit, a high fuel efficiency, etc., may be achieved. It is desirable to change the configuration of the general power unit as little as possible and not to increase complexity in manufacturing steps and manufacturing cost, when a hybrid utility vehicle is implemented.

SUMMARY OF THE INVENTION

The present invention addresses the above described condition, and an object of the present invention is to provide a hybrid utility vehicle which can be manufactured without substantially increasing complexity in manufacturing steps and manufacturing cost.

A hybrid utility vehicle of the present invention comprises right and left front wheels suspended from a vehicle body; a front differential gear device coupled to the right and left front wheels via a pair of front axles, respectively, and including an input shaft extending in a direction substantially perpendicular to the front axles; and a front electric motor positioned at a front portion of the vehicle body and coupled to the input shaft of the front differential gear device.

In accordance with this configuration, the front electric motor is coupled to the input shaft of the front differential gear device coupled to a propeller shaft in a conventional configuration. Because of this, the conventional front differential gear device can be easily incorporated into the hybrid utility vehicle to electrically drive the front wheels. In addition, the front wheels can be electrically driven merely by using the single front electric motor. This can simplify the overall utility vehicle. Moreover, since the front electric motor is positioned at the front portion of the vehicle body, a ground pressure (contact pressure) of the front wheels can be increased, and hence steerability and mobility of the utility vehicle driving off-road can be improved.

The above and further objects, features and advantages of the invention will more fully be apparent from the following detailed description with reference to the accompanying drawings.

DETAILED DESCRIPTION OF THE PREFERRED EMBODIMENTS

Figure 1:
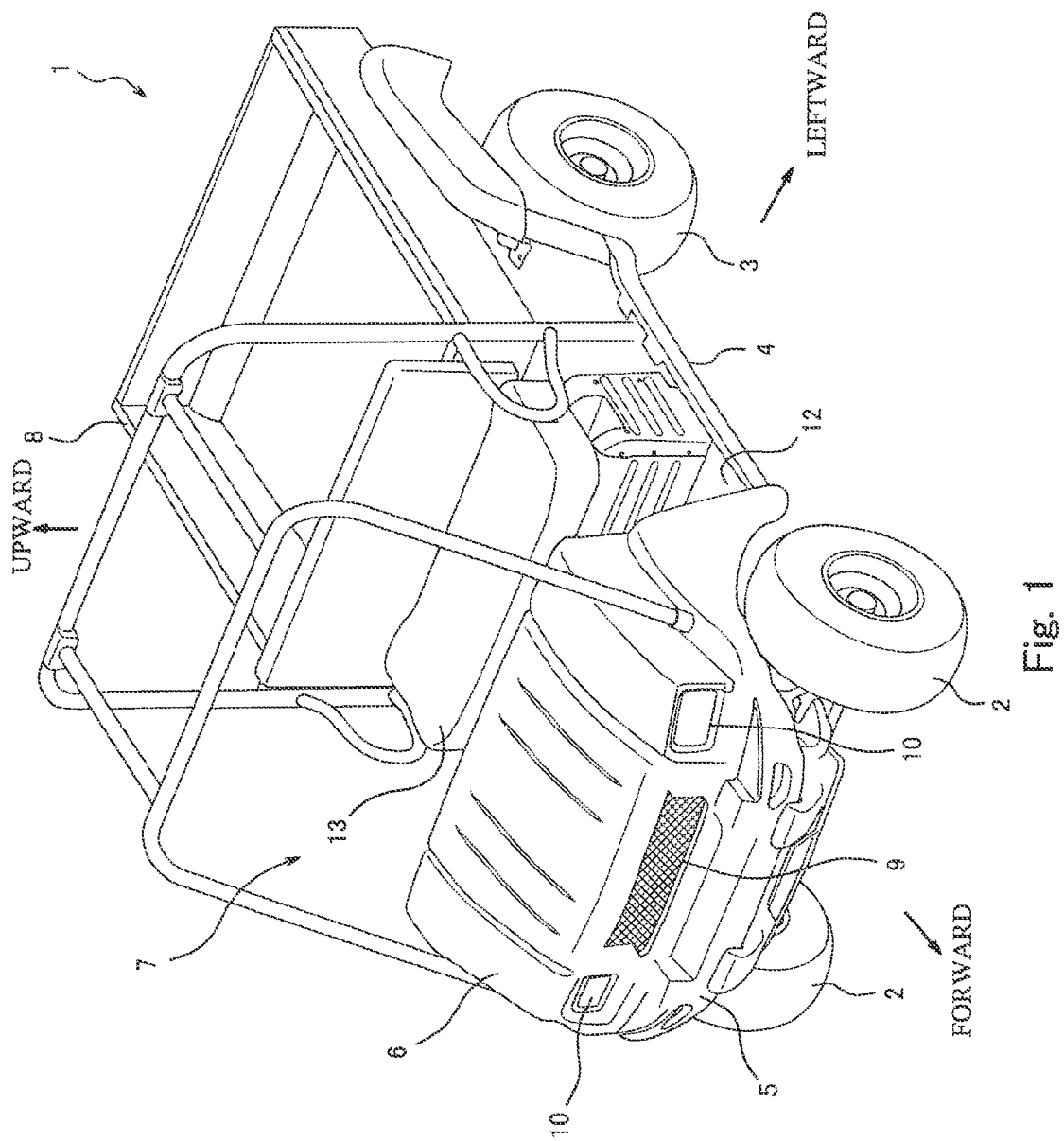
FIG. 1 is a perspective view of a hybrid utility vehicle according to an embodiment of the present invention.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in a hybrid utility vehicle unless otherwise explicitly noted.

FIG. 1 is a perspective view showing an external appearance of a hybrid utility vehicle 1 (hereinafter referred to as utility vehicle 1) according to an embodiment of the present invention. The utility vehicle 1 may be used in various ways such as a golf cart or a farming truck. The utility vehicle 1 is a multi-purpose vehicle which is required to have off-road mobility. In the present embodiment, the utility vehicle 1 is intended for two persons and has four wheels, but may be intended for four persons.

As shown in FIG. 1, the utility vehicle 1 includes right and left front wheels 2, right and left rear wheels 3, and a vehicle body 4 from which these four wheels 2 and 3 are suspended. The vehicle body 4 is provided with a front bumper 5, a hood 6, a cabin space 7 and a cargo bed 8 in this order from a forward direction. The cargo bed 8 is disposed behind the cabin space 7 and above the rear wheels 3. The cabin space 7 is a space for accommodating persons, and is positioned at an intermediate portion of the vehicle body 4 in a forward and rearward direction. The hood 6 is positioned in front of the cabin space 7 and above the front wheels 2. The front bumper 5 is positioned below and in front of the hood 6. A grill 9 and a pair of right and left front lights 10 are provided between the front edge of the hood 6 and the rear edge of the front bumper 5. Ram air from the forward direction flows into a space defined by the hood 6 via the grill 9. The pair of front lights 10 are arranged to sandwich the grill 9 in a rightward and leftward direction.

Figure 2:
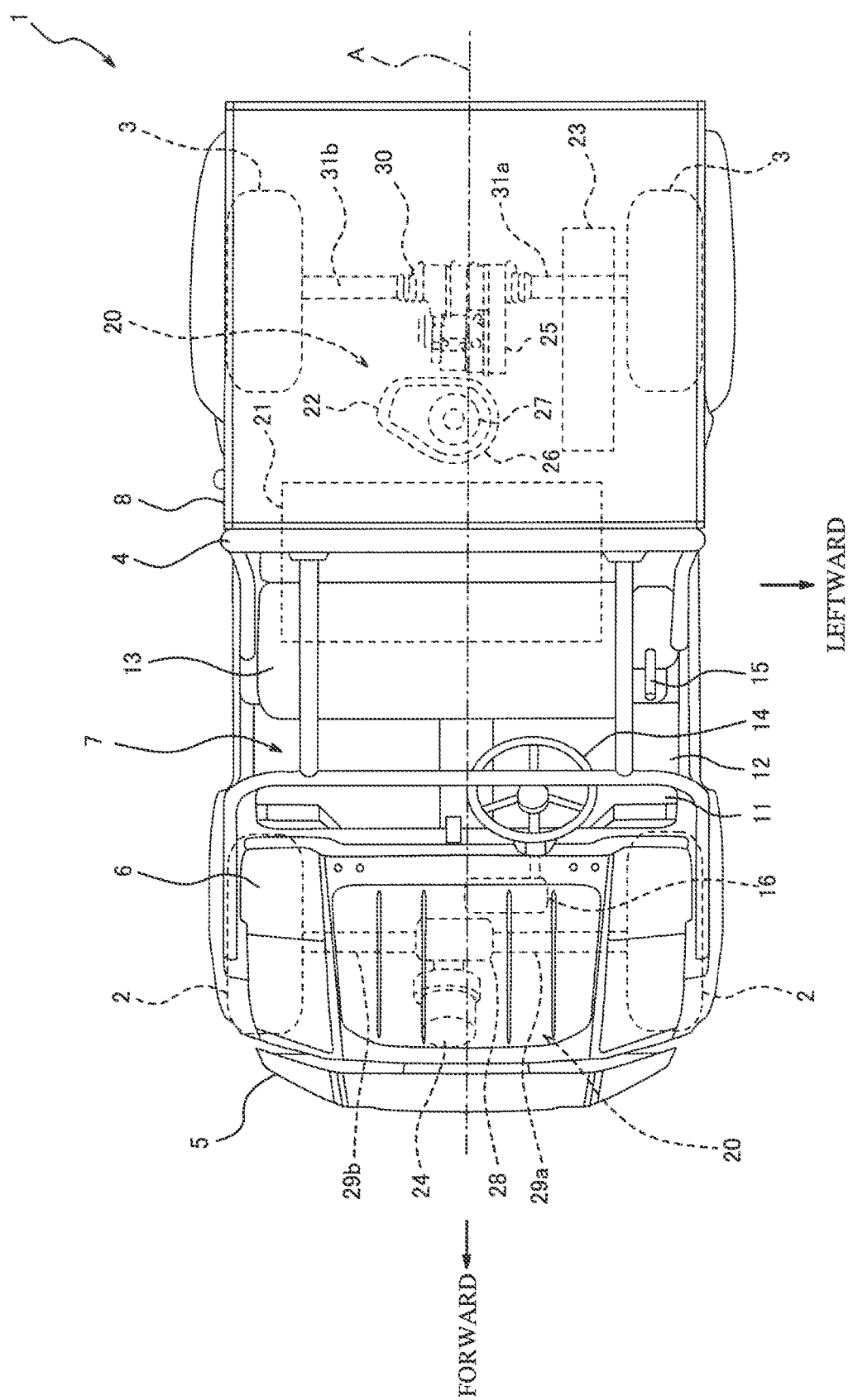
FIG. 2 is a plan view of the hybrid utility vehicle of FIG. 1.

FIG. 2 is a plan view of the utility vehicle 1 of FIG. 1. As shown in FIG. 2, the cabin space 7 is defined by the frame of the vehicle body 4, a dash board 11, and a floor panel 12. A seat 13 and a plurality of driving operation members are provided in the cabin space 7. The seat 13 is, for example, a laterally elongated bench seat, and two persons can be seated side by side on the seat 13. In the present embodiment, a substantially left part of the cabin space 7 is a space for the driver, and the driver can be seated on the left part of the seat 13. The plurality of driving operation members include a steering wheel 14, an accelerator pedal (not shown), a brake pedal (not shown), and a parking brake lever 15. The steering wheel 14 protrudes rearward from the dash board 11. The driver seated on the seat 13 faces the steering wheel 14 in the forward and rearward direction. Under the hood 6, the right and left front wheels 2 and a steering device 16 are arranged. The steering device 16 causes the right and left front wheels 2 to turn according to the rotational direction and rotational position of the steering wheel 14.

A power unit 20 of the utility vehicle 1 mainly includes a battery 21, an engine electric generator 22, a control unit 23, a front motor 24, and a rear motor 25. As shown in FIG. 2, the battery 21 is positioned below the seat 13 and/or the cargo bed 8, and the engine electric generator 22 and the control unit 23 are positioned below the cargo bed 8. However, the arrangement of the battery 21, the engine electric generator 22 and the control unit 23 is not particularly limited.

The battery 21 is configured to store DC power. The engine electric generator 22 includes an engine 26, and an electric generator 27 driven by the engine 26 to generate AC power. In the present embodiment, the engine electric generator 22 is mechanically independent of the front wheels 2 and the rear wheels 3, and the driving power generated by the engine 26 is used exclusively for driving the electric generator 27. The control unit 23 includes an inverter unit for converting the DC power stored in the battery 21 into AC power, and a converter unit for converting the AC power generated in the engine electric generator 22 into DC power. The battery 21 is charged with the DC power which the control unit 23 has converted from the AC power generated by the engine electric generator 22. The front motor 24 and the rear motor 25 are actuated by the AC power supplied by the control unit 23 to generate driving power for propelling the utility vehicle 1.

The front motor 24 is disposed at the front portion of the vehicle body 4, and is covered with the hood 6. Below the hood 6, a front differential gear device 28 is disposed, together with the front motor 24. The front differential gear device 28 is coupled to the left front wheel 2 and to the right front wheel 2 via a pair of front axles 29a and 29b, respectively. Driving power generated by the front motor 24 is transmitted to the left and right front wheels 2 via the front differential gear device 28 and the pair of front axles 29a and 29b, thereby allowing the right and left front wheels 2 to rotate.

The rear motor 25 is disposed at the rear portion of the vehicle body 4 and covered with the cargo bed 8. Below the cargo bed 8, a rear differential gear device 30 is disposed, together with the rear motor 25. The output shaft of the rear motor 25 is coupled to the input shaft of the rear differential gear device 30. The rear differential gear device 30 is coupled to the left rear wheel 3 and to the right rear wheel 3 via a pair of rear axles 31a and 31b, respectively. Driving power generated by the rear motor 25 is transmitted to the left and right rear wheels 3 via the rear differential gear device 30 and the pair of rear axles 31a and 31b, thereby allowing the left and right rear wheels 3 to rotate.

As should be appreciated from the above, the power unit 20 of the present embodiment is a series-hybrid power unit and four-wheel drive. The driving power generated by the front motor 24 is used exclusively for driving the front wheels 2, while the driving power generated by the rear motor 25 is used exclusively for driving the rear wheels 3. That is, the rear differential gear device 30 is mechanically independent of the front differential gear device 28. Because of this, a propeller shaft which is included in a conventional power unit can be omitted. This can make the cabin space 7 lower and ensure a space in which components such as the battery 21 can be disposed. The conventional power unit must include mechanical components such as a clutch to select whether the driving power is fed to both of the front wheels 2 and to the rear wheels 3, or the driving power is transmitted only to the front wheels 2 or to the rear wheels 3. In the present embodiment, one of a state where only the front wheels 2 are driven, a state where only the rear wheels 3 are driven, and a state where the four wheels 2 and 3 are driven, can be selected easily.

The front motor 24 is positioned to be deviated in one direction (rightward in the present embodiment) of a vehicle width direction from a center line A in the vehicle width direction, while the rear motor 25 is positioned to be deviated in the other direction (leftward in the present embodiment) of the vehicle width direction from the center line A. Because of this arrangement, a weight balance of the overall utility vehicle 1 in the vehicle width direction can be kept even when the front wheels 24 and the rear motor 25 are great in size and weight.

The front motor 24 is positioned at the front portion of the vehicle body 4. In more detail, when viewed from above, the front motor 24 is positioned in front of a middle region in the forward and rearward direction in a region which is covered with the hood 6. Also, when viewed from above, the front motor 24 is positioned between the right and left front wheels 2. Since the front motor 24 is positioned in this way, a pressure (ground pressure or contact pressure) of the front wheels 2, to be precise, a pressure applied from the front wheels 2 to the ground, can be increased. As a result, off-road steerability and off-road mobility can be enhanced. This is very advantageous to the utility vehicle 1.

Figure 3:
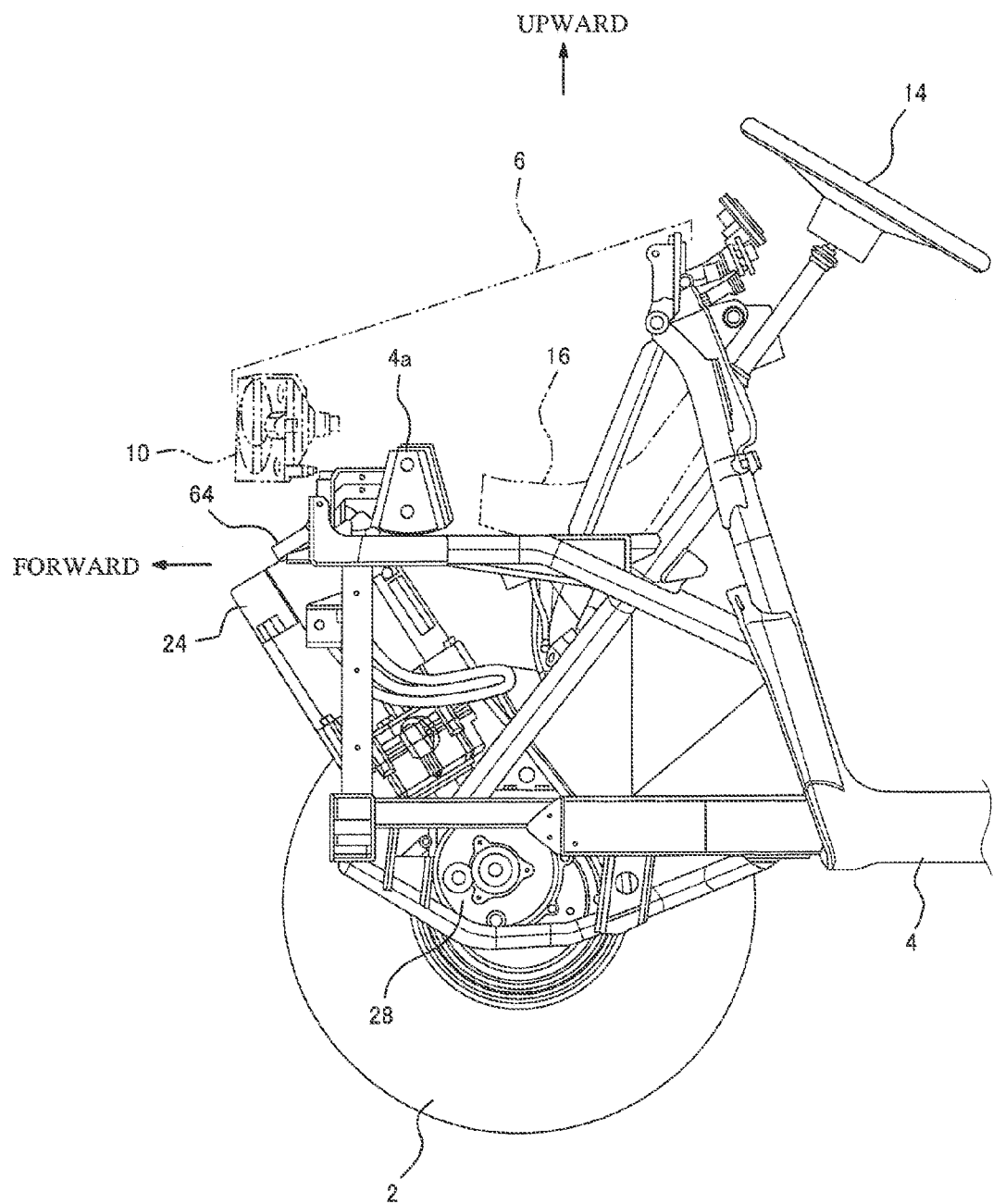
FIG. 3 is a partial left side view of the hybrid utility vehicle of FIG. 1, showing a state where some of the components are omitted.

FIG. 3 is a partial left side view of the utility vehicle 1 of FIG. 1, in a state where part of the components are omitted. As shown in FIG. 3, the front differential gear device 28 is positioned to overlap with the center of the right front wheel 2 and the center of the left front wheel 2 as viewed from the side. The front motor 24 is positioned in front of and above the front differential gear device 28. Since the front motor 24 is positioned in front of the front differential gear device 28, the front motor 24 easily receives the ram air. In the present embodiment, the ram air flows into the underside of the hood 6 via the grill 9 (see FIG. 1), and the front motor 24 is positioned in front of the middle region in the forward and rearward direction in the region which is covered with the hood 6. Because of this, the front motor 24 easily receives the ram air passing through the grill 9, thereby resulting in an increased cooling efficiency of the front motor 24. In addition, since the front motor 24 is positioned above the front differential gear device 28, it is possible to suitably prevent the front motor 24 from getting contaminated or damaged by mud and other debris.

The cabin space 7 for the driver and the passenger is provided behind the hood 6. Immediately behind a space below the hood 6, the dash board 11 (see FIG. 2) and the floor panel 12 (see FIG. 7) defining the cabin space 7 are arranged. Since the front motor 24 is positioned in front of the front differential gear device 28, it is possible to inhibit the front motor 24 from interfering with these components 11 and 12 (see FIG. 2). In addition, the front motor 24 extends upward from the front differential gear device 28 such that it is tilted forward. Because of this, it is also possible to inhibit the front motor 24 from interfering with a component disposed immediately above the front motor 24 or a component disposed immediately in front of the front motor 24. The component disposed immediately above the front motor 24 is, for example, the frame defining the vehicle body 4, while the component disposed immediately in front of the front motor 24 is, for example, the grill 9 or the front bumper 5.

Figure 4:
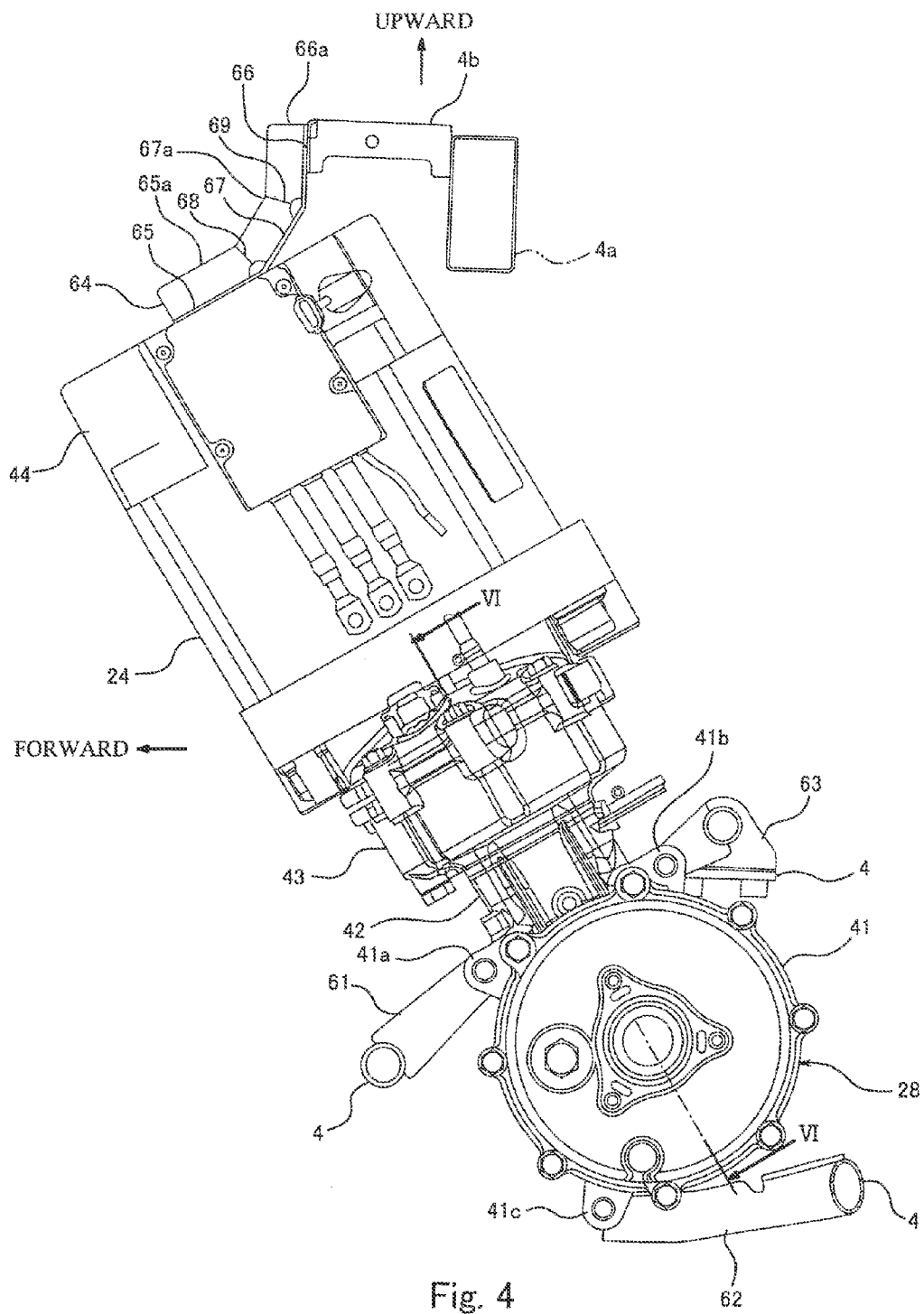
FIG. 4 is a left side view of a front motor and a front differential gear device of FIG. 3.

FIG. 4 is a left side view of the front motor 24 and the front differential gear device 28 of FIG. 3. As shown in FIG. 4, the front differential gear device 28 includes a first case portion 41, a second case portion 42, and a third case portion 43. The first case portion 41 has a substantially circular shape as viewed from the side. The second case portion 42 has a substantially cylindrical shape, and protrudes from the first case portion 41 radially outward. The axis of the second case portion 42 passes through the center of the first case portion 41 and is tilted upward in a forward direction when viewed from the first case portion 41. The third case portion 43 has a hollow elongated-circular disc shape, and is continuous with the end portion of the second case portion 42 which is on the opposite side of the end portion of the second case portion 42 which is closer to the first case portion 41. The third case portion 43 has a great size in the rightward and leftward direction and protrudes to the right more than the second case portion 42 (see FIG. 6 as well as FIG. 4), although this is not clearly depicted in FIG. 4.

The front motor 24 has a cylindrical housing 44. The housing 44 is mounted to the upper surface of a protruding portion of the third case portion 43 such that the housing 44 is tilted forward and upward from the third case portion 43. The center axis of the housing 44 coincides with the center axis of the second case portion 42 when viewed from the side and passes through the center of the first case portion 41. The front differential gear device 28 is secured to the vehicle body 4 in such a manner that three flanges 41a, 41b, and 41c arranged to correspond to the left portion, upper portion and lower portion of the first case portion 41, respectively, are fastened to a bracket 61 extending from the vehicle body 4, a fastening member 63 mounted to the vehicle body 4, and a bracket 62 extending from the vehicle body 4, respectively.

Figure 5:
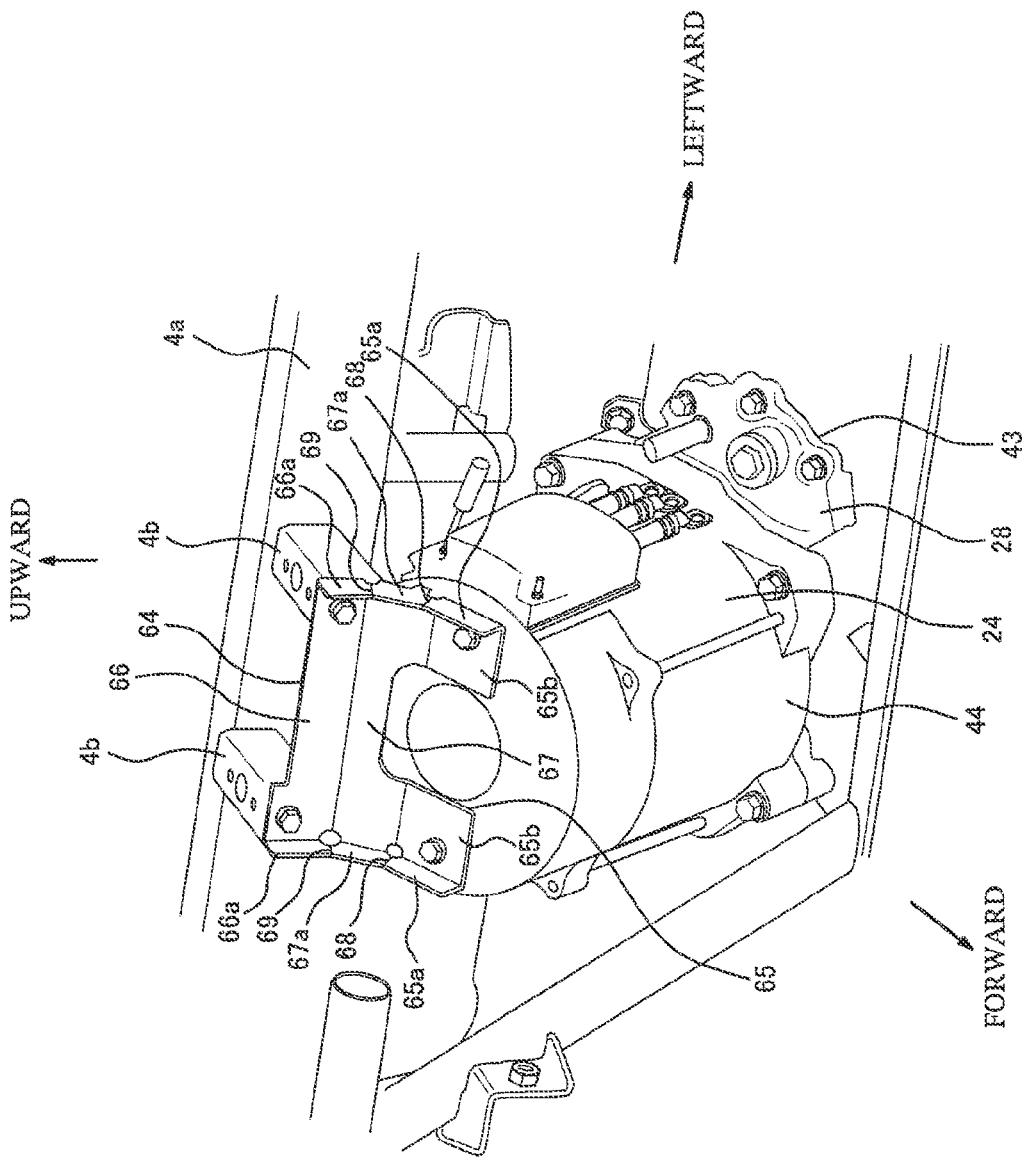
FIG. 5 is a perspective view showing a configuration surrounding the front motor of FIG. 3.

FIG. 5 is a perspective view showing a configuration surrounding the front motor 24 of FIG. 3. Referring to FIG. 5, the housing 44 of the front motor 24 is coupled to brackets 4b fastened to a frame 4a defining the vehicle body 4 via a coupling member 64. The frame 4a extends substantially horizontally in the vehicle width direction at the front portion of the vehicle body 4. The brackets 4b protrude forward from the frame 4a. The coupling member 64 couples, to the brackets 4b, a portion of the housing 44 of the front motor 24 which is on an opposite side of a portion thereof which is coupled to the front differential gear device 28. The outer surface of the portion of the housing 44 which is on the opposite side has a substantially circular shape and is tilted upward and forward. The front surface of each bracket 4b to which the coupling member 64 is fastened extends in the rightward and leftward direction and in the upward and downward direction.

The coupling member 64 is formed by bending a metal plate. The coupling member 64 includes a first fastening portion 65 fastened to the outer surface of the housing 44 in surface contact therewith, a second fastening portion 66 fastened to the front surfaces of the brackets 4b in surface contact therewith, and an intermediate portion 67 connecting the rear edge of the first fastening portion 65 to the lower edge of the second fastening portion 66.

The first fastening portion 65, the second fastening portion 66 and the intermediate portion 67 have upright portions 65a, upright portions 66a, and upright portions 67a, respectively. The upright portions 65a extend vertically upward at a right angle from the right and left edges of the first fastening portion 65. The upright portions 66a extend vertically upward at a right angle from the right and left edges of the second fastening portion 66. The upright portions 67a extend vertically upward at a right angle from the right and left edges of the third fastening portion 67. A slit 68 is provided between the upright portion 65a of the first fastening portion 65 and the upright portion 67a of the intermediate portion 67, while a slit 69 is provided between the upright portion 67a of the intermediate portion 67 and the upright portion 66a of the second fastening portion 66. The first fastening portion 65 has a fork portion 65b extending from the second fastening portion 66 such that the second fastening portion 66 and front fork 65b form a substantially U-shape.

The front motor 24 is coupled to the frame 4a by means of the coupling member 64 having the slits 68 and 69 and the fork portion 65b. There are no coupling mechanisms for coupling the front motor 24 to the vehicle body 4 other than the coupling member 64. Because of this, even if a reactive force against a torque (torque reactive force) is applied axially from the right and rear wheels 2 (see FIG. 3) to the housing 44 of the front motor 24 via the front differential gear device 28, the coupling member 64 is elastically deformed to absorb this torque reactive force. In addition, if the vehicle body 4 is twisted, the coupling member 64 is elastically deformed to absorb this twist motion. To be more specific, if the vehicle body 4 is twisted around an axis in the rightward and leftward direction or in the upward and downward direction, or an upward torque reactive force is applied from the front differential gear device 28 to the front motor 24, the slits 68 and 69 permit the coupling member 64 to be elastically deformed according to this twist motion or torque reactive force. If the vehicle body 4 is twisted around an axis in the forward and rearward direction, the fork portion 65b permits the coupling member 64 to be elastically deformed according to this twist motion. This makes it possible to suitably suppress a load originating from the twist motion or the torque reactive force from being applied to the housing 44 of the front motor 24.

Figure 6:
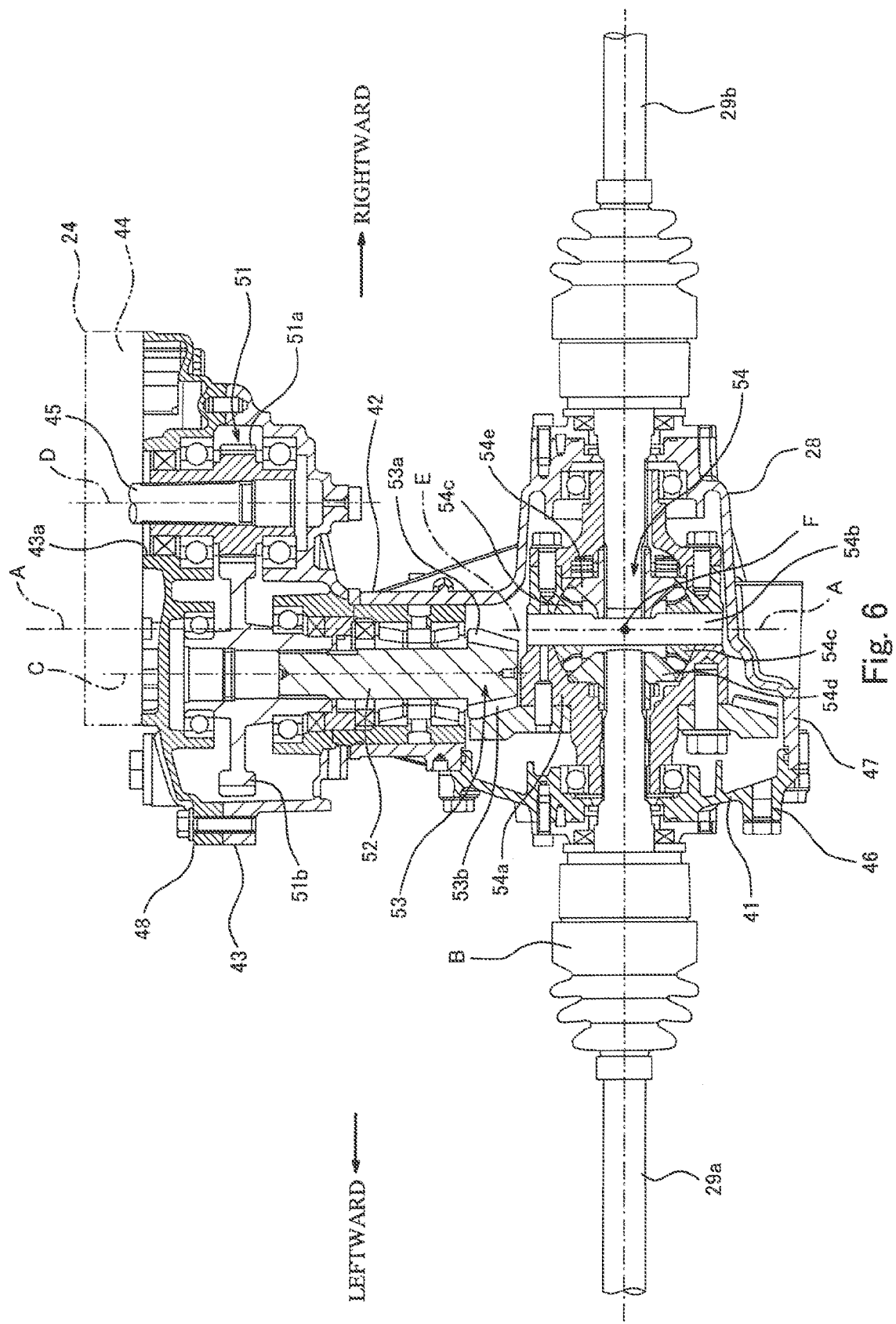
FIG. 6 is a cross-sectional view taken along VI-VI of FIG. 4.

FIG. 6 is a cross-sectional view taken along VI-VI of FIG. 4. As shown in FIG. 6, the front differential gear device 28 includes, as casing members, a left case 46, a right case 47, and an upper cover 48. The left case 46 and the right case 47 are joined together separably in the rightward and leftward direction. In a state where the left case 46 and the right case 47 are joined together, the first case portion 41 and the second case portion 42 are formed, and the lower-half portion of the third case portion 43 is formed to open upward. The upper cover 48 is separably joined to the left case 46 and to the right case 47 such that it covers the lower-half portion of the third case portion 43 from above, thereby forming the upper-half portion of the third case portion 43. In a state where the three casing members are joined together, the interior of the first case portion 41 communicates with the interior of the third case portion 43 via the interior of the second case portion 42. The number of components used to form the first to third case portions 41 to 43 are in no way particularly limited.

As described above, the third case portion 43 protrudes to the right when viewed from the second case portion 42. A shaft insertion hole 43a is formed on the upper wall (i.e., upper cover 48) of the protruding portion of the third case portion 43. An output shaft 45 of the front motor 24 is inserted through the shaft insertion hole 43a and protrudes into the third case portion 43. In contrast, the base portions of the pair of front axles 29a and 29b are accommodated into the first case portion 41. In a state where no load is applied externally, the left and right front axles 29a and 29b are aligned coaxially (see common center axis B).

The front differential gear device 28 includes a primary reduction gear mechanism 51, an input shaft 52, a secondary reduction gear mechanism 53, and a differential bevel gear mechanism 54, which constitute a driving power transmission mechanism for transmitting a driving power generated in the output shaft 45 of the front motor 24 to the pair of front axles 29*a* and 29*b*. The primary reduction gear mechanism 51 is accommodated into the third case portion 43. The input shaft 52 penetrates into the interior of the second case portion 42. The secondary reduction gear mechanism 53 and the differential bevel gear mechanism 54 are accommodated in the first case portion 41. A center axis C of the input shaft 52 coincides with the center axis of the second case portion 42 and is parallel to a center axis D of the output shaft 45 of the front motor 24.

The primary reduction gear mechanism 51 is a parallel-axis reduction gear mechanism. For example, as the primary reduction gear mechanism 51, a gear train including two external gears in mesh may be suitably used. In the present embodiment, the primary reduction gear mechanism 51 includes a drive external gear 51*a* mounted on the output shaft 45, and a driven external gear 51*b* mounted on the base end portion of the input shaft 52 and adapted to mesh with the drive external gear 51*a*. The secondary reduction gear mechanism 53 includes a drive bevel gear 53*a* mounted on the tip end portion of the input shaft 52, and a driven bevel gear 53*b* mounted on the left front axle 29*a* such that the driven bevel gear 53*b* is rotatable freely relative to the front axle 29*a* and is adapted to mesh with the drive bevel gear 53*a*. The differential bevel gear mechanism 54 includes a differential case 54*a* rotatable integrally with the driven bevel gear 53*b*, a pinion shaft 54*b* secured to the differential case 54*a* and extending in a direction perpendicular to the front axles 29*a* and 29*b*, a pair of bevel pinions 54*c* which are rotatable freely on the pinion shaft 54*b*, a left side gear 54*d* mounted on the base end of the left front axle 29*a*, and a right side gear 54*e* mounted on the base end of the right front axle 29*b*. The base end portions of the pair of front axles 29*a* and 29*b* protrude into the differential case 54*a*. Inside the differential case 54*a*, the side gears 54*d* and 54*e* face each other in the rightward and leftward direction, and are in mesh with the pair of bevel pinions 54*c*, respectively.

In accordance with the front motor 24 and the front differential gear device 28, upon the front motor 24 being actuated, the output shaft 45 rotates. The rotation of the output shaft 45 is transmitted to the input shaft 52 after its speed is reduced by the primary reduction gear mechanism 51. The rotation of the input shaft 52 is transmitted to the differential case 54*a* of the differential bevel gear mechanism 54 after its speed is reduced by the secondary reduction gear mechanism 53. Receiving the driving power transmitted from the front motor 24, the differential bevel gear mechanism 54 feeds it to the left and right front axles 29*a* and 29*b* with a substantially equal magnitude while absorbing an inner wheel difference. Since the output shaft 45 of the single front motor 24 is coupled to the input shaft 52 of the front differential gear device 28, the right and left front wheels 2 can be driven only by the single front motor 24. Therefore, the overall utility vehicle 1 can be simplified in configuration, as compared to a wheel-in type configuration in which motors which are equal in the number of wheels of tires are provided within the wheels to respectively correspond to the wheels.

A conventional typical power unit includes a front differential gear device. A propeller shaft is coupled to the input shaft of the front differential gear device. In contrast, in the present embodiment, such a propeller shaft is omitted, and the output shaft 45 of the front motor 24 incorporated into the utility vehicle 1 as a novel driving power source is coupled to the input shaft 52 of the front differential gear device 28. Since the front motor 24 is configured in this way, the front differential gear device conventionally used can be easily incorporated into the series-hybrid four-wheel-drive power unit. Therefore, the utility vehicle 1 including the power unit can be implemented substantially without causing complexity in manufacturing steps and increasing manufacturing cost.

The input shaft 52 of the front differential gear device 28 extends in the direction substantially perpendicular to the left and right front axles 29*a* and 29*b*. In other words, the input shaft 52 extends from the differential bevel gear mechanism 54 radially outward relative to the front axles 29*a* and 29*b*, i.e., away from the front axles 29*a* and 29*b*. The conventional front differential gear device is configured in a similar manner. The output shaft 45 of the front motor 24 is coupled to the input shaft 52 such that the output shaft 45 is closer to the end portion of the input shaft 52, which is on the opposite side of the end portion of the input shaft 52 which is closer to the front axles 29*a* and 29*b*. Because of this structure, the front motor 24, having a greater size in a radial direction than the propeller shaft, is prevented from interfering with the casing members 46 to 48 in the conventional front differential gear device.

In the conventional power unit, a front differential gear device and a rear differential gear device are mechanically coupled together via a transmission and a propeller shaft. In the present embodiment, the power unit 20 includes the front motor 24 used exclusively for driving the front wheels 2 and the rear motor 25 (see FIG. 2) used exclusively for driving the rear wheels 3, and the front differential gear device 28 is mechanically independent of the rear differential gear device 30 (see FIG. 2). Accordingly, the front differential gear device 28 includes the primary reduction gear mechanism 51 which reduces the speed of the rotation of the output shaft 45 of the front motor 24 and then transmits the rotation to the input shaft 52. The primary reduction gear mechanism 51 makes it possible to suitably absorb the difference between the rotational speed of the rear wheels 3 and the rotational speed of the front wheels 2, in the utility vehicle 1 using the conventional differential gear device. As a result, smooth four-wheel-drive is implemented without a need for complex processing executed in the control unit 23.

As described above, the input shaft 52 is substantially perpendicular to the front axles 29*a* and 29*b*. The front axles 29*a* and 29*b* are required to extend in the rightward and leftward direction. Therefore, the input shaft 52 may be oriented in any direction within a plane perpendicular to the center axis B of the front axles 29*a* and 29*b*. Therefore, the center axis of the housing 44 and the center axis of the output shaft 45 in the front motor 24 can extend upward such that they are tilted forward from the front differential gear device 28 and can extend in parallel with the input shaft 52, which configuration is easily implemented. Since the center axis D of the output shaft 45 of the front motor 24 is parallel to the center axis C of the input shaft 52, the parallel-axis reduction gear mechanism may be used as the primary reduction gear mechanism 51. Regardless of the arrangement in which the reduction gear mechanism is disposed between the output shaft 45 of the front motor 24 and the input shaft 52 of the front differential gear device 28, it is possible to suppress the overall assembly of the front motor 24 and the front differential gear device 28 from increasing in size in the axial direction of the input shaft 52.

Hereinafter, an intersection of the center axis B of the front axles 29*a* and 29*b* aligned with the axis E of the pinion shaft 54*b* is a center F of the differential bevel gear mechanism 54. The input shaft 52 of the front differential gear device 28 is deviated in one direction (in the present embodiment, to the left) of the vehicle width direction from the center F of the differential bevel gear mechanism 54, while the output shaft 45 of the front motor 24 is deviated in an opposite direction (in the present embodiment, to the right) of the vehicle width direction from the input shaft 52 of the front differential gear device 28. Because of this, the front motor 24 can be positioned closer to the center F of the differential bevel gear mechanism 54. As a result, a weight balance of the front motor 24 and the front differential gear device 28 in the rightward and leftward direction can be maintained.

In the present embodiment, the center line A in the vehicle width direction passes through the center F of the differential bevel gear mechanism 54. Since the primary reduction gear mechanism 51 is the parallel-axis reduction gear mechanism, a distance between the output shaft 45 and the input shaft 52 in the rightward and leftward direction is greater than a distance between the center F and the input shaft 52 in the rightward and leftward direction. Because of this, the output shaft 45 is deviated in the opposite direction (in the present embodiment, to the right) of the vehicle width direction from the center F. In the present embodiment, since the center line A in the vehicle width direction passes through the center F of the differential bevel gear mechanism 54, the output shaft 45 is deviated in the opposite direction (in the present embodiment, to the right) of the vehicle width direction from the center line A. Accordingly, the rear motor 25 used as a novel driving power source along with the front motor 24, is deviated in one direction (in the present embodiment, to the left) of the vehicle width direction. This makes it possible to keep a weight balance of the overall power unit 20 in the vehicle width direction.

Thus far, the embodiment of the present invention has been described. However, the above described configuration is merely exemplary, and may be suitably modified. For example, the power unit is not limited to the four-wheel-drive power unit, but may instead be a front-wheel drive power unit. In this case, the rear motor 25 may be omitted. Moreover, the power unit is not limited to the series-hybrid power unit but may instead be a parallel-hybrid power unit or a series/parallel hybrid power unit.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
   right and left front wheels suspended from a vehicle body;
   a front differential gear device coupled to the right and left front wheels via a pair of front axles, respectively, and including an input shaft extending in a direction substantially perpendicular to the front axles; and
   a front electric motor positioned at a front portion of the vehicle body and coupled to the input shaft of the front differential gear device;
   right and left rear wheels suspended from the vehicle body;
   a rear differential gear device provided mechanically independent of the front differential gear device, the rear differential gear device being coupled to the right and left rear wheels via a pair of rear axles, respectively; and
   a rear electric motor coupled to the rear differential gear device;
   wherein the front electric motor is positioned forward relative to the front differential gear device;
   wherein the front differential gear device includes a reduction gear mechanism which is disposed between an output shaft of the front electric motor and the input shaft of the front differential gear device, reduces a speed of rotation of the output shaft of the front electric motor and transmits rotation of the output shaft of the front electric motor to the input shaft of the front differential gear device at the reduced speed of rotation;
   the front electric motor is deviated in one direction of a vehicle width direction from a center line in the vehicle width direction; and
   the rear electric motor is deviated in an opposite direction of the vehicle width direction from the center line in the vehicle width direction.

2. A utility vehicle comprising:
   right and left front wheels suspended from a vehicle body;
   a front differential gear device coupled to the right and left front wheels via a pair of front axles, respectively, and including an input shaft extending in a direction substantially perpendicular to the front axles; and
   a front electric motor positioned at a front portion of the vehicle body and coupled to the input shaft of the front differential gear device;
   wherein the front electric motor is positioned forward relative to the front differential gear device;
   an output shaft of the front electric motor is disposed in parallel with the input shaft of the front differential gear device; and
   the front electric motor deviated in one direction of a vehicle width direction from a center of the vehicle.

3. A utility vehicle comprising:
   right and left front wheels suspended from a vehicle body;
   a front differential gear device coupled to the right and left front wheels via a pair of front axles, respectively, and including an input shaft extending in a direction substantially perpendicular to the front axles; and
   a front electric motor positioned at a front portion of the vehicle body and coupled to the input shaft of the front differential gear device;
   wherein the front electric motor is positioned forward relative to the front differential gear device;
   the front electric motor is deviated in one direction of a vehicle width direction from a center of the vehicle, the one direction being opposite to a direction in which a steering wheel is deviated from the center of the vehicle in the vehicle width direction.

4. The utility vehicle according to claim 3,
   wherein the front electric motor is positioned above relative to the front differential gear device.

5. The utility vehicle according to claim 4,
   wherein the front electric motor extends upward from the front differential gear device such that the front electric motor is tilted forward.

6. The utility vehicle according to claim 3, wherein an output shaft of the front electric motor is disposed in parallel with the input shaft of the front differential gear device.

7. A utility vehicle comprising:
   right and left front wheels suspended from a vehicle body;
   a front differential gear device coupled to the right and left front wheels via a pair of front axles, respectively, and including an input shaft extending in a direction substantially perpendicular to the front axles; and
   a front electric motor positioned at a front portion of the vehicle body and coupled to the input shaft of the front differential gear device;
   wherein an output shaft of the electric motor is disposed in parallel with the input shaft of the front differential gear device.

8. The utility vehicle according to claim 7, further comprising:

a coupling member for coupling to the vehicle body a portion of the front electric motor which is on an opposite side of a portion of the front electric motor which is coupled to the input shaft;
wherein the coupling member is elastically deformable.

9. The utility vehicle according to claim 7, further comprising:
right and left rear wheels suspended from the vehicle body;
a rear differential gear device provided mechanically independent of the front differential gear device, the rear differential gear device being coupled to the right and left rear wheels via a pair of rear axles, respectively; and
a rear electric motor coupled to the rear differential gear device;
wherein the front differential gear device includes a reduction gear mechanism which is disposed between an output shaft of the front electric motor and the input shaft of the front differential gear device, reduces a speed of rotation of the output shaft of the front electric motor and transmits rotation of the output shaft of the front electric motor to the input shaft of the front differential gear device at the reduced speed of rotation.

10. The utility vehicle according to claim 9,
wherein the output shaft of the front electric motor is disposed in parallel with the input shaft of the front differential gear device.

11. The utility vehicle according to claim 7,
wherein the front differential gear device includes a differential bevel gear mechanism; and
the input shaft is deviated in one direction of a vehicle width direction from a center of the differential bevel gear mechanism, and the output shaft is deviated in an opposite direction of the vehicle width direction from the input shaft.

12. The utility vehicle according to claim 7,
right and left rear wheels suspended from the vehicle body;
a rear differential gear device provided mechanically independent of the front differential gear device, the rear differential gear device being coupled to the right and left rear wheels via a pair of rear axles, respectively; and
a rear electric motor coupled to the rear differential gear device;
wherein the front differential gear device includes a reduction gear mechanism which is disposed between an output shaft of the front electric motor and the input shaft of the front differential gear device, reduces a speed of rotation of the output shaft of the front electric motor and transmits rotation of the output shaft of the front electric motor to the input shaft of the front differential gear device at the reduced speed of rotation.

13. The utility vehicle according to claim 7,
wherein the front differential gear device includes a differential bevel gear mechanism; and
the input shaft is deviated in one direction of a vehicle width direction from a center of the differential bevel gear mechanism, and the output shaft is deviated in an opposite direction of the vehicle width direction from the input shaft.

14. The utility vehicle according to claim 7, wherein the front differential gear device includes a reduction gear mechanism which is disposed between an output shaft of the front electric motor and the input shaft of the front differential gear device, reduces a speed of rotation of the output shaft of the front electric motor and transmits the rotation to the input shaft of the front differential gear device.

15. The utility vehicle according to claim 7, wherein the front electric motor is deviated in one direction of a vehicle width direction from a center of the vehicle, the one direction being opposite to a direction in which a steering wheel is deviated from the center of the vehicle in the vehicle width direction.

16. The utility vehicle according to claim 7, wherein the front electric motor is positioned forward relative to the front differential gear device.

17. The utility vehicle according to claim 7, wherein the front electric motor is positioned above relative to the front differential gear device.

* * * * *